United States Patent [19]

Stinesen

[11] Patent Number: 4,791,624
[45] Date of Patent: Dec. 13, 1988

[54] DEVICE FOR CENTERING A ROTATING DISK

[75] Inventor: Bernardus J. Stinesen, Eindhoven, Netherlands

[73] Assignee: U.S. Philips Corporation, New York, N.Y.

[21] Appl. No.: 945,110

[22] Filed: Dec. 19, 1986

[30] Foreign Application Priority Data

Dec. 20, 1985 [NL] Netherlands .......................... 8503523

[51] Int. Cl.⁴ .............................................. G11B 17/03
[52] U.S. Cl. ...................................................... 369/270
[58] Field of Search ................................... 369/270, 271

[56] References Cited

U.S. PATENT DOCUMENTS

| 4,403,319 | 9/1983 | Adamek | 369/270 |
| 4,408,318 | 10/1983 | Sugiura | 369/270 |
| 4,514,839 | 4/1985 | Eisemann | 369/270 |
| 4,562,570 | 12/1985 | Denton | 369/270 |
| 4,649,445 | 3/1987 | Sheriff | 369/270 |
| 4,649,531 | 3/1987 | Horowitz et al. | 369/270 |

FOREIGN PATENT DOCUMENTS 150261 8/1985 Japan .................................. 369/270

*Primary Examiner*—Steven L. Stephan
*Attorney, Agent, or Firm*—F. Brice Faller

[57] ABSTRACT

A device for centering a disc to be read or recorded while rotating includes a turntable and a plurality of centering parts resiliently connected thereto and extending above the supporting surface thereof concentrically about the axis of rotation. Each centering part has a pair of connection strips connected thereto remote from its free end and extending toward the axis of rotation, each connection strip also extending toward and being connected to an adjacent connecting strip extending from another connecting part. Deflecting a free end of any centering part toward the axis of rotation causes other such parts to be likewise deflected, thereby assuring concentricity of the disc with the axis.

12 Claims, 4 Drawing Sheets

DEVICE FOR CENTERING A ROTATING DISK

BACKGROUND OF THE INVENTION

The invention relates to a device for centring, during operation, a disk to be read or recorded while rotating. The device comprises a turntable which, during operation, can be rotated about an axis of rotation and a number of centring parts which are connected to the turntable. In the operating condition of the disk, the parts are situated at least partly in the central disk hole and can be swung against the resilience with their free ends in the direction of the axis of rotation about a pivot extending at least substantially tangentially with respect to a circle situated concentrically about the axis of rotation.

Such a device is disclosed in U.S. Pat. No. 4,218,065 (herewith incorporated by reference). As explained therein it is necessary in devices for optically reading or optically writing a disk to accommodate the disk in a position which is correct as accurately as possible both for writing and reading and both in the axial and radial directions. In order to obtain a good accommodation in the radial direction, centring parts are each connected with one end to a supporting member in such a manner that the free ends thereof can be swung independently of each other against resilient action in the direction of the axis of rotation. In itself this construction is satisfactory but if a force in the plane of the disk is exerted on the disk placed on the turntable, as a result of which it is moved in a position which is eccentric with respect to the axis of rotation, some of the centring parts will be swung with their free ends in the direction of the axis of rotation, while further centring parts situated approximately diametrically opposite to said centring parts will tend to swing in a direction away from the axis of rotation under the influence of the resilient force. When the force is removed it may occur that, as a result of the occurring friction between the centring parts and the edge of the disk hole, the disk can be forced back by the centring parts into the position which is not accurately concentric with respect to the axis of rotation and hence the disk will remain in a position which is slightly eccentric with respect to the axis of rotation.

SUMMARY OF THE INVENTION

According to the invention the centring parts, at their ends remote from their free ends, are connected to connection strips which extend away from the ends in question in the direction of the axis of rotation and towards each other, the ends of the connection strips remote from the centring parts being connected together.

When using the construction according to the invention, if the free end of a centring part is swung in the direction of the axis of rotation, said movement will be transferred by the connection strips to the other centring parts in such a manner that the other parts will also move in the direction of the axis of rotation with their free ends. As a result the centring parts will ensure a position of the disk which is concentric with respect to the axis of rotation.

DETAILED DESCRIPTION OF THE PREFERRED EMBODIMENTS

Figure 1:
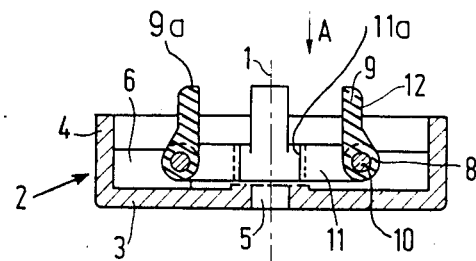
FIG. 1 is a diagrammatic sectional view of a turntable and a number of centring parts connected to said turntable.
Figure 2:
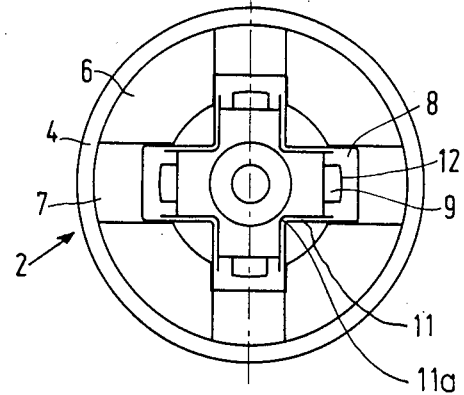
FIG. 2 is a plan view of FIG. 1.

FIGS. 1 and 2 show a turntable 2 which, during operation, can be rotated about an axis of rotation 1 and which comprises a plate-shaped base part 3 which extends at right angles to the axis of rotation 1 and on the outer circumference of which an upright edge 4 is formed integrally with base part 3.

The turntable 2 may be incorporated in an optical disk player and be connected to a drive spindle which can be inserted into a hole 5 in the plate-shaped base part. The arrangement of the turntable in a video player may be, for example, as described in the above-mentioned U.S. Pat. No. 4,218,065. Since the further construction of the disk player in which the turntable is incorporated does not form part of the invention, such a disk player has not been shown and will not be described.

Figure 3:
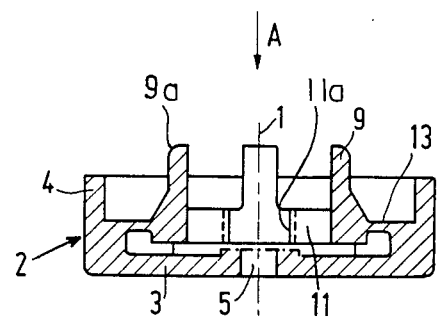
FIG. 3 is a diagrammatic sectional view of a second embodiment of a turntable having centring parts connected to said turntable.
Figure 4:
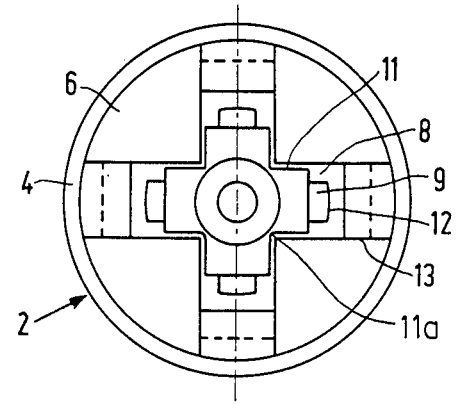
FIG. 4 is a plan view of FIG. 3.

Parts 6 in the form of annular segments and adjoining the base part 3 within the edge 4 are provided on the upper surface of the plate-shaped base part and define four radially extending grooves 7 at 90° intervals around the axis of rotation 1. A connection element 8 from which a digital centring part 9 extends upwards, is present in each of the grooves 7. In the embodiment shown in FIG. 1, each connection element 8 with the parts 6 present on each side thereof is connected to a pivot 10 which extends at right angles to the longitudinal axis of the groove 7 in which the connection element in question is situated. The pivot 10 may be formed by a pin as is shown in FIG. 1, but when the turntable 2 with the parts 6 and the connection elements are manufactured as one assembly of a synthetic resin, as shown in FIGS. 3 and 4, such a pivoting joint can also be realized by means of a suitable connection between the edge 4 of the turntable and the connection elements 8.

Connection strips 11 form one assembly with the connection elements 8 and adjoin the ends of the elements. The connection strips of connection elements 8 situated diagonally opposite to each other extend in orthogonal directions. Each connection strip 11 is connected to the adjacent orthogonally extending connection strip 11 to form an L shaped connection member between two adjacent connection elements.

As may furthermore be seen in particular from FIG. 1 the free ends of the centring parts 9 are rounded off so that a disk can easily be slid over the centering parts 9 in the direction of the arrow A, the outermost boundary surfaces 12 of the centring parts 9 which extend substantially parallel to the axis of rotation 1 becoming located against the rigid boundary edge of the central disk hole.

If a force is directed more or less radially with respect to the axis of rotation 1 on a centring part 9, the centring part 9 in question will be rotated about the pivot 10 in question. This movement is transmitted, via the connection element 8 supporting the centring part 9 in question, to the connection strips 11 connected to that connection element. The strips 11, in view of their large height, measured in a direction parallel to the axis of rotation 1, have a great bending strength and a small torsional strength in comparison with their thickness. Consequently, the ends 11a of the connection strips 11 connected to the centring part 9 in question and situated nearest to the axis of rotation will tend to move downwards as viewed in FIG. 1. Since these ends of the adjacent connection strips are connected to connection strips which extend at right angles and which are connected to the connection elements 8 of adjacent centering parts 9 which are situated on each side of the centring part moved with its free end 9a in the direction of the axis of rotation 1, the free ends 9a of the adjacent centering parts will also tend to swing in the direction of the axis of rotation 1. Since the adjacent centering parts 9 are also connected, via connection strips 11, to the centring part which is situated diametrically opposite to the centring part which is moved with its free end initially in the direction of the axis of rotation 1, all centring parts will ultimately be moved with their free ends in the direction of the axis of rotation 1 against the inherent resilient force of the connection strips 11 which are connected together and are manufactured from a synthetic resin.

Thus if one of the centring parts 9 is swung with its free end in the direction of the axis of rotation, the other centering parts remain at least substantially concentric with respect to the axis of rotation 1, so that a correct centring of the disk on the turntable with respect to the axis of rotation will always be ensured.

In FIGS. 3 and 4 the pivot is formed by a thin ridge 13 of a synthetic resin material which connects the element 8 to the turntable on its side remote from the axis of rotation. The imaginary axis of rotation about which a centring part 9 can be swung with respect to the turntable is situated at a larger distance from the axis of rotation 1 than the boundary edge 12 of the centring part which cooperates with the rigid edge of the disk hole. When pressing the disk in the direction of the arrow A the centring parts can be consequently swing easily in the direction of the axis of rotation whereas, when pulling the disk in a direction away from the arrow A, it will tend to move outwards. Consequently the force necessary to provide the disk will be smaller than the force necessary to remove the disk from the turntable.

Figure 5:
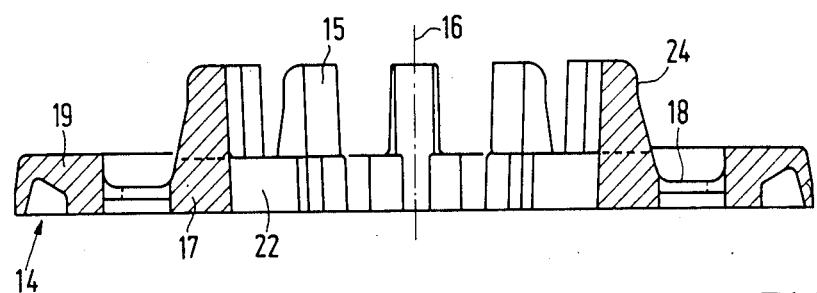
FIG. 5 is a sectional view through a centring member comprising a number of centring parts.

A preferred embodiment of the construction according to the invention of the turntable and centring parts is shown in FIGS. 5-10. Centering member 14 manufactured from a synthetic resin has twelve centring parts 15 which are arranged at regular angular distances from each other and which, as shown in FIG. 5, each adjoin with their lower end a connection element 17 extending concentrically about the centre line 16 of the centring element 14. The connection elements 17 supporting the centring parts 15 are connected, by means of a thin flange-shaped part 18, to a supporting ring 19 forming the outer circumference of the centring member 14. At the area of each centring part an aperture 20 is provided in the flange-shaped part 18 between the connection element 17 associated with the relevant centring part and the supporting ring 19. Centrally between each set of adjacent apertures 20 a slot 21 is provided radially in the flange-shaped part 18 and separates the adjacent ends of the connection elements 17 from adjacent centring parts 15 and furthermore extends up to a short distance from the inner circumference of the supporting ring 19 in the flange-shaped part 18.

Each of the connection elements 17 is adjoined by two parallel extending connection strips 22 which also extend parallel to a radial plane through the axis of rotation 16 situated centrally between said strips.

The connection strips 22 which adjoin the facing ends of two connection elements 17 succeeding each other in the circumferential direction are connected together at their ends remote from the connection elements in question by a connection part 23. All centering parts 15 are connected together via the connection elements 17, the connection strips 22, and the connection parts 23.

Figure 6:
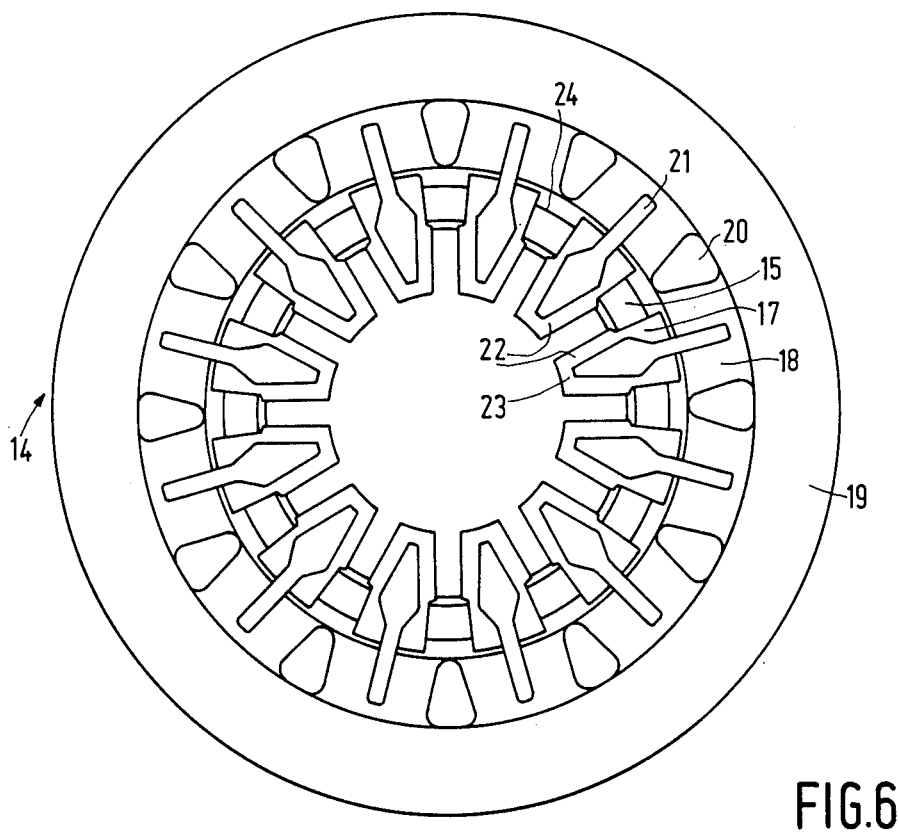
FIG. 6 is a plan view of FIG. 5.

As may be seen from FIGS. 5 and 6, the connection strips 22, measured in the direction of the centre line 16, have a comparatively large height as compared with their thickness.

The part of the comparatively thin flange-shaped part 18 situated at the area of the centring part constitutes an imaginary pivot which extends at right angles to a radius through the centre of the centring part 15 in question and about which the centring part 15 in question can be swung with respect to the annular part 19. It will be obvious that such a swing of a centring part 15 will result in the remaining centring parts also tending to swing with their free ends in the directions of the centre line 16 against the inherent resilience of the interconnected connection strips 22. The operation of said centring member 14 hence is in principle equal to that of the preceding embodiments. In this case also the imaginary pivot about which a centring part 15 can be swung is situated at a larger distance from the centre line 16 of the centering member 14 then the outermost boundary plane 24 of the centring part which cooperates with the boundary edge of the disk hole.

The centring member described with reference to FIGS. 5 and 6 is destined in particular for use in combination with a turntable 25 shown in FIGS. 7 and 8. Turntable 25 has a plate-shaped part 26 which is connected to a centrally accommodated hub 27 having a central hole 28 for receiving a drive spindle.

Figure 7:
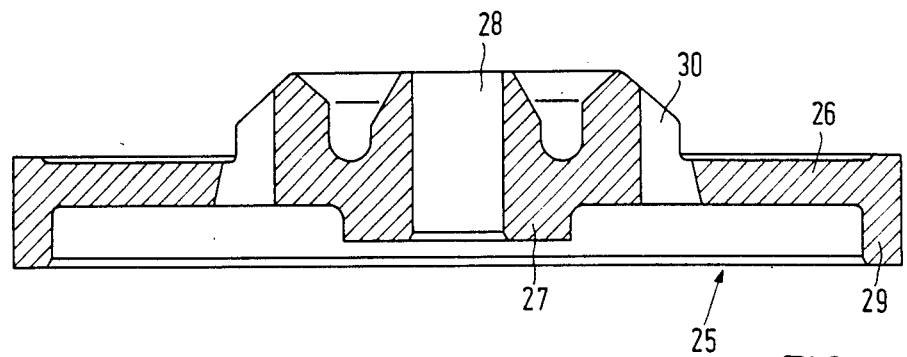
FIG. 7 is a sectional view through a turntable to be used with the centring member shown in FIGS. 5 and 6.
Figure 8:
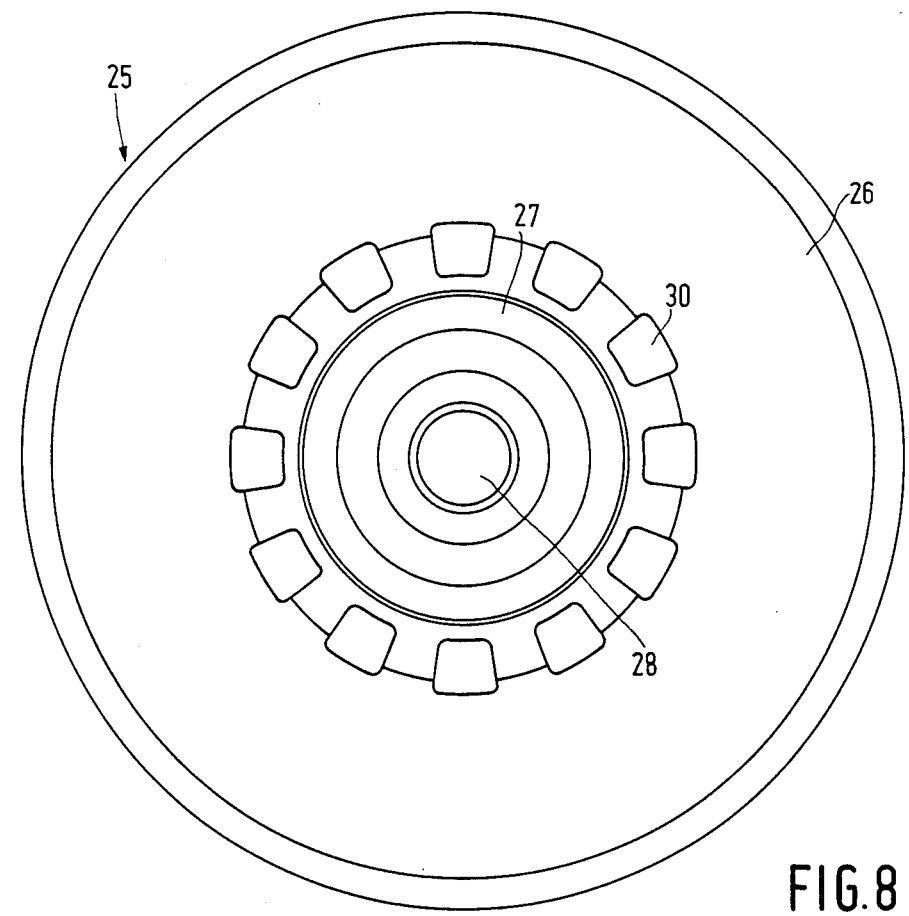
FIG. 8 is a plan view of FIG. 7.

On its outer circumference the plate-shaped part 26 has a downward extending circumferential shoulder 29 as is shown in FIG. 7. At the area of the transition from the plate-shaped part 26 in the hub 27 twelve apertures 30 are provided in the turntable at regular distances from each other.

Figure 9:
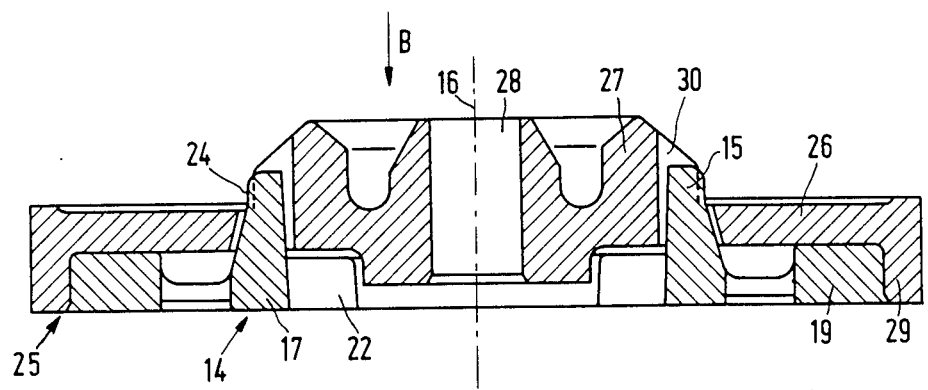
FIG. 9 is a sectional view through the turntable shown in FIGS. 7 and 8 with the centring member shown in FIGS. 5 and 6.
Figure 10:
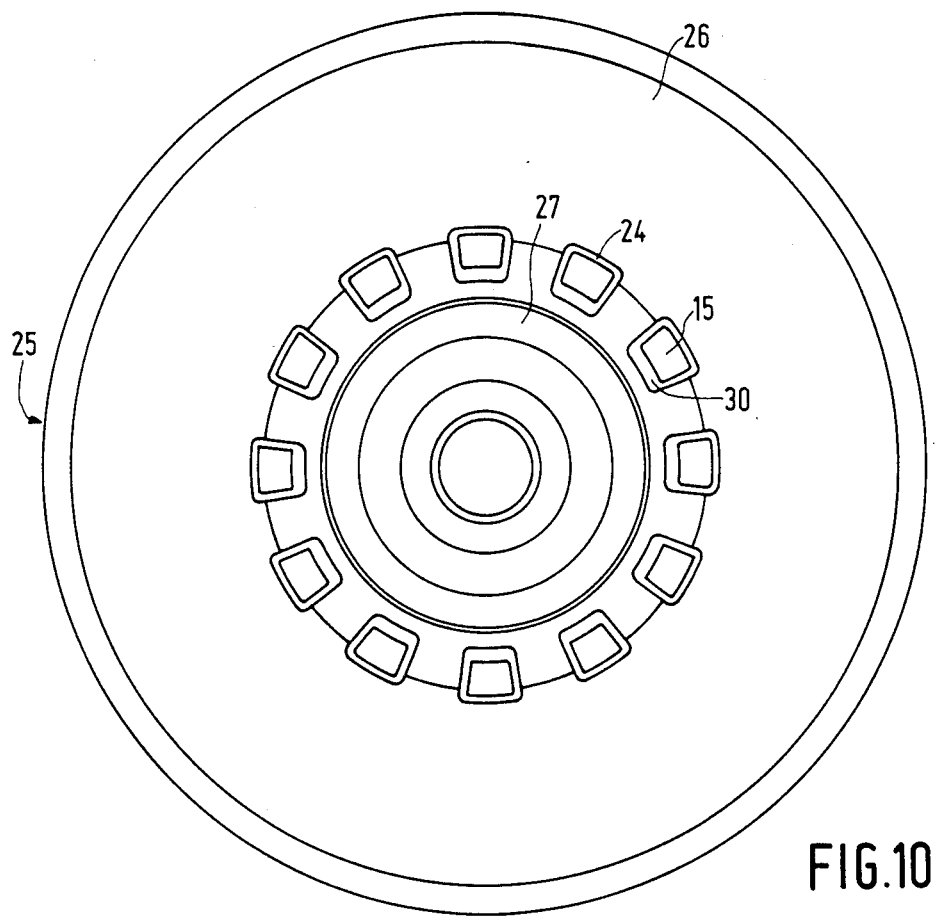
FIG. 10 is a plan view of FIG. 9.

As is shown in particular in FIGS. 9 and 10 the construction is such that the centring member 14 can be received in the space surrounded by the shoulder 29, the centring parts 15 falling in the apertures 30 and projecting with their upper ends above the plate-shaped part 26. As is shown in particular in FIG. 10 the outsides of the centring members are free from the walls of the apertures 30. The inside diameter of the shoulder 29 and the outside diameter of the supporting ring 19 are such that the centring member is retained in the position shown in FIG. 9 with respect to the turntable, for example, by friction between the outer circumference of the supporting ring 19 and the inner wall of the shoulder 29. When a disk is placed on the turntable in the direction of the arrow B, viewed in FIG. 9, the disk will bear on the top of the turntable, the outermost boundary surfaces of the centring parts engaging the boundary edge of the disk hole and thus centring the disk with respect to the axis of rotation of the turntable.

Since the conical upper end of the hub 27 projects above the top ends of the centring parts 15, the top end of the hub guides the disk, when the disk is placed on the turntable, to a position which is at least substantially concentric with respect to the axis of rotation of the turntable before the disk contacts the centring parts, as a result of which undesired forces do not influence the centering parts. The cylindrical part of the hub adjoining the conical top end has an outside diameter which is only slightly smaller than the diameter of the circle on which the outermost boundary surfaces 24 of the centring parts 15 contacting the edge of the disk hole are situated. As a result of this only parts of the free ends of the centring parts 15 cooperating with the boundary edge of the disk edge protect slightly beyond the outer circumference of the hub 27 so that the centering parts 15 are incorporated in the turntable 15 so as to be readily protected.

Although in the above embodiments the resilience against the action of which the centring parts can be swung in the direction of the axis of rotation is provided by the inherent resilience of the connection strips manufactured from a synthetic resin integrally with the centring parts, it will also be feasible to provide separate springs for providing the required resilience.

What is claimed:

1. A device for centering a disc to be read or recorded while rotating, said disc having a central disc hole, said device comprising:
    a turntable having an axis of rotation and a supporting surface for a disk,
    a plurality of centering parts resiliently connected to said turntable and situated concentrically about said axis of rotation, said centering parts each having a pivot which extends at least substantially tangentially with respect to a circle situated concentrically about the axis of rotation, said centering parts having free ends which can be pivoted resiliently about said pivots and toward the axis of rotation, said centering parts extending above the supporting surface and being situated at least partly in the central disk hole when the disk is in the operating position,
    a pair of connection strips connected to each centering part remote from its free end and extending toward the axis of rotation, each connection strip extending also toward an adjacent connection strip extending from another centering part, each connection strip having an end remote from the pivot and the centering part to which it is connected, each said end of said strip being connected to the end of said adjacent strip.

2. A device as claimed in claim 1, characterized in that each centring part (9, 15) is connected to two connection strips (11, 22) which are accommodated symmetrically with respect to a plane extending through the axis of rotation (1, 16) and the centre of the centring part (9, 15) in question, the connection strips situated closest together of two centring parts succeeding each other in the circumferential direction being connected together.

3. A device as claimed in claim 1, characterized in that the centring parts (9, 15) and the connection strips (11, 22) are manufactured from one piece of a resilient synthetic resin.

4. A device as claimed in claim 1, characterized in that a connection strip (11, 22) has a rectangular cross-section the long rectangular side of which extends at least substantially parallel to the axis of rotation (1, 16).

5. A device as claimed in claim 1, characterized in that remote from its free end each centring part (15) is connected to a connection element (17) and the connection elements are connected, by means of a flange-shaped part (18), to a supporting ring (19) extending concentrically with respect to the axis of rotation and surrounding the connection elements, all this in such a manner that the connection elements (17) with the centring parts (15) can swing with respect to the supporting ring (19) about imaginary pivots formed by the flange-shaped part.

6. A device as claimed in claim 5, characterized in that a hole (20) is provided in the flange-shaped part (18) at the area of each centring part (15).

7. A device as claimed in claim 5, characterized in that at the area where connection elements (17) supporting two centring parts (15) are adjacent slot (21) is provided in the flange-shaped part (18), which slot extends radially from the inner circumference of said flange-shaped part (18).

8. A device as claimed in claim 1, characterized in that the device comprises twelve centering parts (15) provided at regular angular distances from each other.

9. A device as claimed in claim 1, characterized in that the centring parts (15) are united with the connection strips (22) to form a centring member (14) which is assembled to the turntable (25) so as to be detachable and consist of a synthetic resin.

10. A device as claimed in claim 9, characterized in that the turntable (25), receives the centering member 14 on its side remote from the supporting surface of the disk, the turntable having apertures 30 situated at regular distances from each other for freely receiving the centring parts (15) of the centring member (14) in such a manner that the free ends of the centring parts (15) project above the supporting surface.

11. A device as claimed in claim 10, characterized in that the turntable comprises a central hub (27) having a conical end part projecting above the free ends of the centring parts (15), the diameter of said part increasing toward the centring parts (15).

12. A device as in claim 11 wherein said recesses extend through said hub about the circumference thereof, said centering parts having outermost boundary surfaces for engaging the central disc hole, said outermost boundary surfaces projecting beyond the circumference of said hub.

* * * * *